(12) United States Patent
Hatmaker, Jr.

(10) Patent No.: US 12,376,531 B1
(45) Date of Patent: Aug. 5, 2025

(54) DEVINING HOOK FOR ELECTRIC TRANSMISSION LINES

(71) Applicant: Dale Keith Hatmaker, Jr., Lafollette, TN (US)

(72) Inventor: Dale Keith Hatmaker, Jr., Lafollette, TN (US)

( * ) Notice: Subject to any disclaimer, the term of this patent is extended or adjusted under 35 U.S.C. 154(b) by 0 days.

(21) Appl. No.: 19/028,562

(22) Filed: Jan. 17, 2025

(51) Int. Cl.
| B25J 1/00 | (2006.01) |
| A01G 3/08 | (2006.01) |
| A47F 13/06 | (2006.01) |
| H02G 1/02 | (2006.01) |

(52) U.S. Cl.
CPC .............. *A01G 3/081* (2013.01); *A47F 13/06* (2013.01); *H02G 1/02* (2013.01)

(58) Field of Classification Search
CPC A01G 3/081; H02G 1/02; A47F 13/06; F16B 45/00; B25J 1/00
USPC .......................................................... 294/175
See application file for complete search history.

(56) References Cited

U.S. PATENT DOCUMENTS

| | | | | |
|---|---|---|---|---|
| 1,521,533 A * | 12/1924 | Henderson | ................ | B26B 5/00 |
| | | | | 30/317 |
| 3,048,139 A * | 8/1962 | Duckett | .................. | B63B 21/54 |
| | | | | 114/221 R |
| 3,799,099 A * | 3/1974 | Conover | .................. | B63B 21/54 |
| | | | | 114/221 R |
| 3,866,965 A * | 2/1975 | Homeier | ................ | H01R 11/14 |
| | | | | 294/174 |
| 3,936,088 A * | 2/1976 | Williams | ................... | B25J 1/04 |
| | | | | 294/24 |
| D312,295 S * | 11/1990 | Travis | .......................... | D22/134 |
| 6,352,291 B1* | 3/2002 | Tortajada | .................. | F21S 4/10 |
| | | | | 294/24 |
| 7,775,570 B2 | 8/2010 | Taylor | | |
| D641,231 S | 7/2011 | Stinson | | |
| D662,384 S * | 6/2012 | Jonsson | .......................... | D8/51 |
| D711,705 S * | 8/2014 | Nihra | ............................... | D8/14 |
| D803,656 S | 11/2017 | Stinson et al. | | |
| 11,345,015 B2* | 5/2022 | Carlson | .................... | B25J 15/10 |
| 2006/0150779 A1* | 7/2006 | Rider | ...................... | H02G 1/04 |
| | | | | 7/143 |
| 2013/0033052 A1 | 2/2013 | Stinson | | |
| 2022/0311224 A1* | 9/2022 | Tuchscherer | ............ | B25G 3/38 |

\* cited by examiner

*Primary Examiner* — Paul T Chin

(74) *Attorney, Agent, or Firm* — HSML P.C.

(57) ABSTRACT

A tool for removing vines from electrical transmission infrastructure includes a shank having two prongs extending therefrom to form two hooks. Each hook defines a concavity having a blade disposed therein. The blades are positioned to cut vines instead of merely pulling the vines, thereby facilitating the removal of vines from electrical transmission infrastructure.

14 Claims, 4 Drawing Sheets

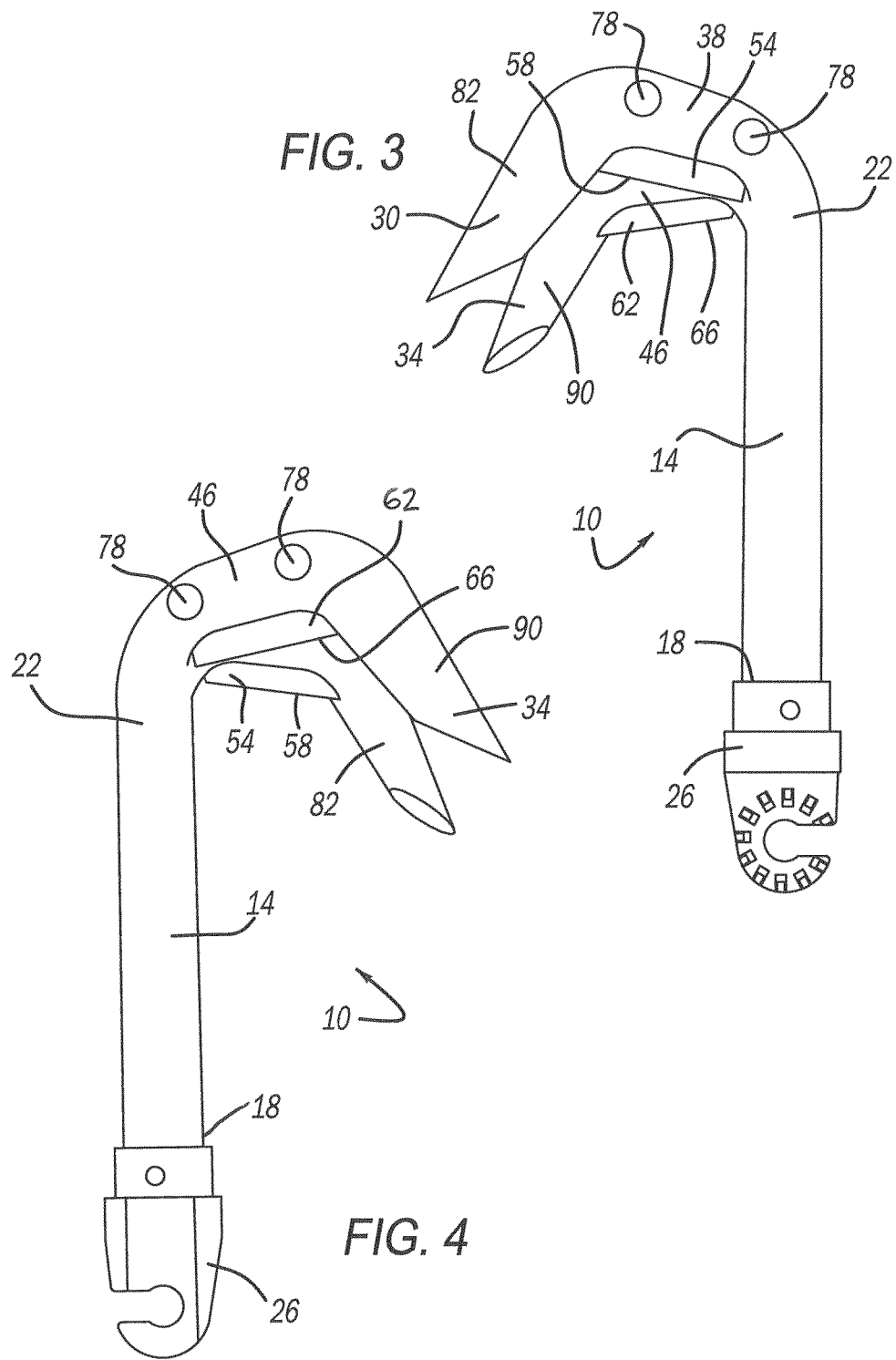

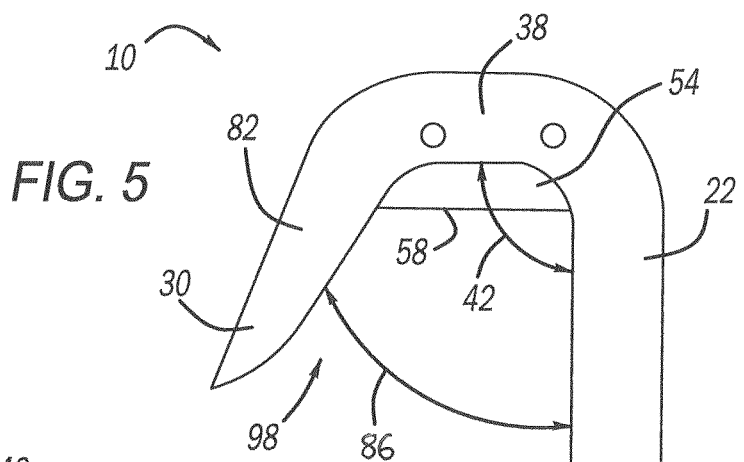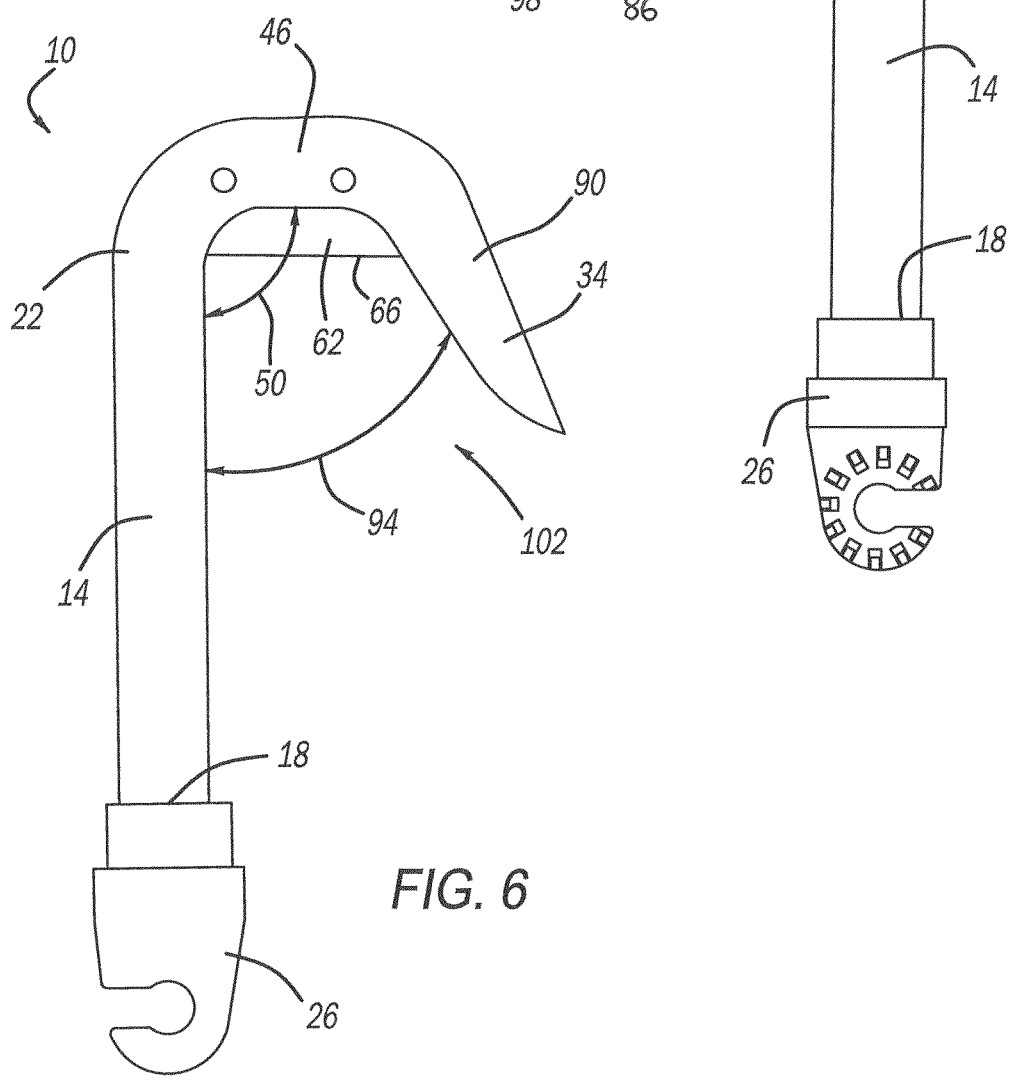

DEVINING HOOK FOR ELECTRIC TRANSMISSION LINES

TECHNICAL FIELD

This disclosure relates to methods and apparatuses for removing vines from wires, cables, and other parts of electrical power transmission infrastructure.

BACKGROUND

Vines are plants that will grow along infrastructure, including guy wires, telephone poles, telephone wires, electrical transmission lines, electrical line support structures, etc. This can be problematic because the weight of the vine may damage the infrastructure, interrupting signal or power transmission. Furthermore, vines may interrupt electrical power or signal transmission.

Vines are widespread and often have rapid growth. Accordingly, electric utilities must spend substantial resources to clear kudzu and other vines from power transmission lines and other related electrical transmission infrastructure.

SUMMARY

A tool for removing vines from electrical transmission infrastructure includes a shank having a first end and a second end. A fastening element is mounted to the first end of the shank and is configured for attachment to a hot stick. First and second prongs extend from the second end of the shank. Each prong has a respective segment that forms an angle with the shank that is between forty-five degrees and one hundred and thirty-five degrees. A first blade is mounted to the first prong and a second blade is mounted to the second prong.

The tool improves upon the prior art by enabling the vine to be cut by the blades, thereby facilitating the vine's removal from electrical transmission equipment. By cutting the vines with the blades attached to the prongs, a maintenance worker can remove vines significantly faster and with less effort compared to the prior art.

A corresponding method of using the tool is also provided.

The above features and advantages and other features and advantages of the present disclosure are readily apparent from the following detailed description of the best modes for carrying out the disclosure when taken in connection with the accompanying drawings

BRIEF DESCRIPTION OF THE DRAWINGS

FIG. 3 is a schematic, perspective view of the tool of FIG. 1;

FIG. 4 is another schematic, perspective view of the tool of FIG. 1;

FIG. 5 is a schematic, right, side view of the tool of FIG. 1;

FIG. 6 is a schematic, left, side view of the tool of FIG. 1;

DESCRIPTION OF THE PREFERRED EMBODIMENTS

Figure 1:
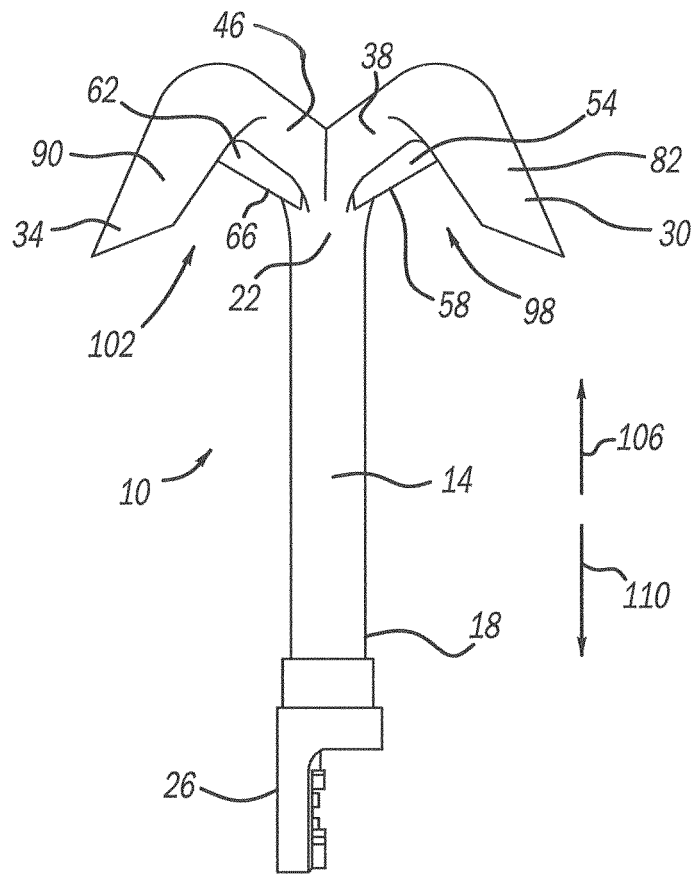
FIG. 1 is a schematic, front view of a tool for removing vines from electrical infrastructure.
Figure 2:
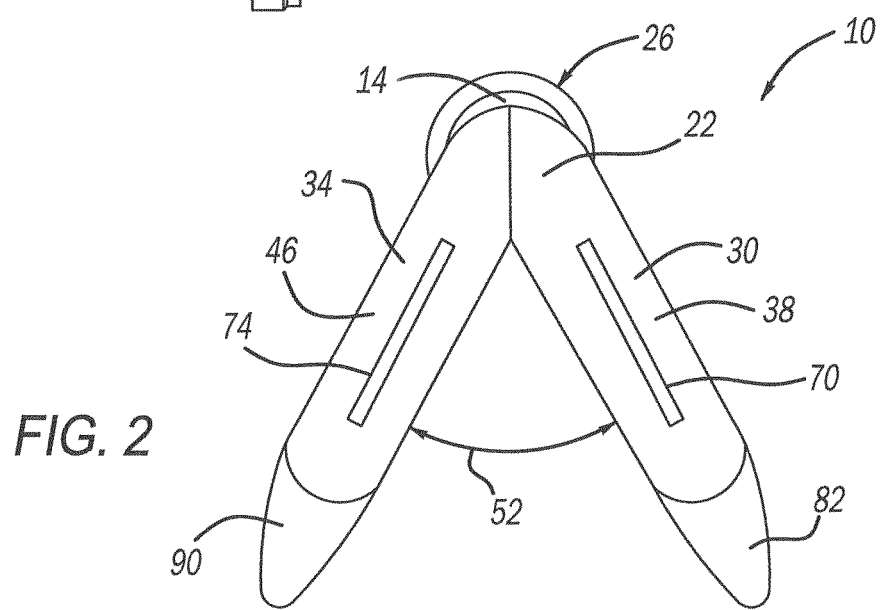
FIG. 2 is a schematic, bottom view of the tool of FIG. 1.

Referring to the Figures, wherein like reference numbers refer to like components throughout, a tool 10 for use in removing vines from electrical infrastructure is schematically depicted. The tool 10 includes a shank 14 having a first end 18 and a second end 22. A fastening element 26 is mounted to the first end 18 of the shank 14 for attaching the tool 10 to an elongated rod such as a hot stick. As understood by those skilled in the art, a "hot stick" is a rod made of highly insulative material such as fiberglass, and is typically at least six feet in length. A hot stick enables a lineman to manipulate energized equipment from a safe distance. The use of fastening element 26 will be apparent to those skilled in the art.

The tool 10 also includes a first prong 30 and a second prong 34, both of which extend from the second end 22 of the shank 14. The first prong 30 has a first segment 38 that forms a first angle 42 with the shank 14. The second prong 34 has a second segment 46 that forms a second angle 50 with the shank 14. Angles 42, 50 are preferably between forty-five degrees and one hundred and thirty-five degrees, and more preferably between seventy degrees and one hundred and ten degrees.

The first prong 30 and the second prong 34 define a third angle 52 therebetween. The third angle 52 is preferably between thirty degrees and one hundred and ten degrees, and more preferably between thirty degrees and seventy-five degrees. In the embodiment depicted, the third angle 52 is fifty degrees.

In the embodiment depicted, the shank 14 and the first and second prongs 30, 34 are formed from a single piece of electrically insulative material such as, but not limited to, a fiberglass composite having nylon as the polymeric matrix. The tool 10 further includes a first blade 54 having a first sharp edge 58 that is mounted to the first segment 38 and a second blade 62 having a second sharp edge 66 that is mounted to the second segment 46. In the embodiment depicted, the blades 54, 62 are formed by an electrically insulative material such as, but not limited to, a ceramic material.

The blades 54, 62 may be mounted to the prongs 30, 34 in any manner within the scope of the claimed invention. In the embodiment depicted, the first segment 38 defines a first slot 70, and the second segment 46 defines a second slot 74. The first blade 54 is partially within the first slot 70 such that the first sharp edge 58 is outside the first slot 70. Similarly, the second blade 62 is partially within the second slot 74 such that the second sharp edge 66 is outside the second slot 74. Fasteners 78 extend through holes in the first and second segments 38, 46 and holes in the first and second blades 54, 62 to retain the blades 54, 62 within the slots 70, 74.

The sharp edges 58, 66 thus extend generally perpendicularly to the shank 14, i.e., the sharp edges 58, 66 are closer to being perpendicular to the shank 14 than parallel. The sharp edges 58, 66 are also unobstructed in a direction that is parallel to the shank 14.

The first prong 30 also defines a third segment 82 extending from the first segment 38 such that the third segment 82 forms a third angle 86 with the shank 14. The second prong 34 defines a fourth segment 90 extending from the second segment 46 such that the fourth segment 90 forms a fourth angle 94 with the shank 14. The third and fourth angles 82,

94 are between ten degrees and seventy degrees, and, in the embodiment depicted, are thirty degrees.

The first and third segments 38, 82 of the first prong 30 cooperate with the shank 14 to define a first concavity 98. Similarly, the second and fourth segments 46, 90 of the second prong 34 cooperate with the shank 14 to define a second concavity 102. The shank 14 extends longitudinally in first and second opposing directions 106, 110, as shown in FIG. 1. The first end 18 and the fastening element 26 are in the second direction 110 from the prongs 30, 34 and the second end 22.

The concavities 98, 102 are open and unobstructed in the second direction 110. The first sharp edge 58 is within the first concavity 98, and the second sharp edge 66 is within the second concavity 102. The sharp edges 58, 66 face the second direction 110 such that any object moving into one of the concavities 98, 102 from the second direction 110 will encounter and contact one of the sharp edges 58, 66. In the embodiment depicted, the sharp edge 58 extends substantially across the first concavity 98 from the third segment 82 to the shank 14, and the sharp edge 66 extends substantially across the second concavity 102 from the fourth segment 90 to the shank 14.

Figure 7:
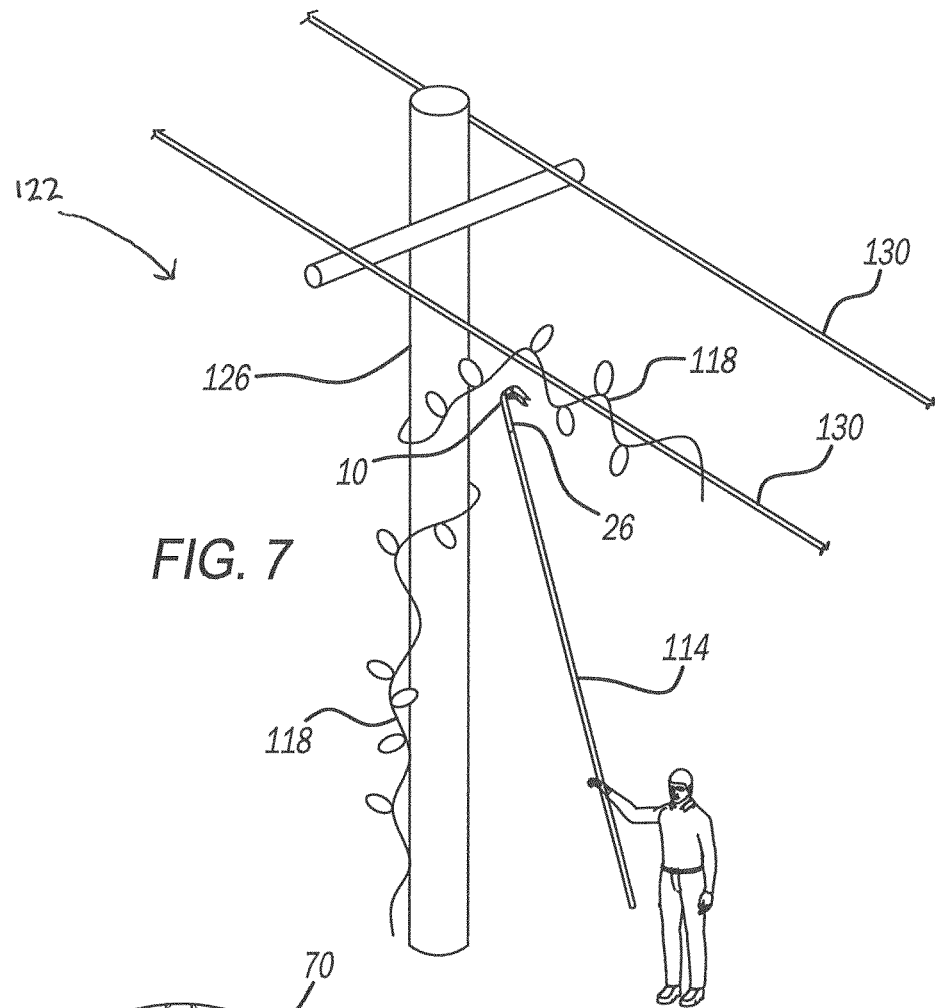
FIG. 7 is a schematic, perspective view of the tool attached to a rod being used to cut a vine growing on electrical infrastructure.
Figure 8:
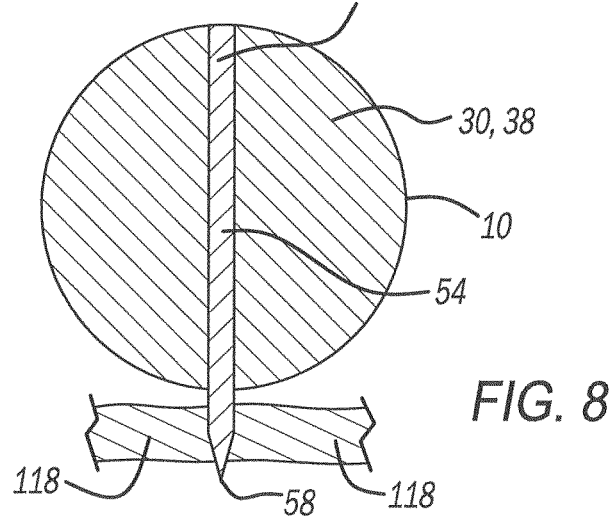
FIG. 8 is a schematic, cross-sectional view of the tool cutting the vine.

FIGS. 7 and 8 schematically depict a method of using the tool 10. Referring specifically to FIG. 7, the method may include possessing a tool 10 and attaching the tool 10 to one end of a rod 114. In the embodiment depicted, the rod 114 is a "hot stick," i.e., the rod 114 is a highly electrically insulative material such as fiberglass. The method may also include manipulating the rod 114 with the tool 10 attached thereto so that the tool 10 moves relative to a vine 118. In the embodiment depicted, the vine 118 is growing along, and is supported by, electrical transmission infrastructure 122. More specifically, in the embodiment depicted, the electrical transmission infrastructure 122 includes a vertical support 126 such as a pole or tower, and electrical transmission lines 130 that are supported by the vertical support 126. As used herein, "electrical transmission infrastructure" may also include any equipment used in the transmission of electrical power including, but not limited to, guy wires (not shown) that are operatively connected to vertical supports 126.

The movement of the tool 10 relative to the vine 118 includes moving the tool 10 relative to the vine 118 in the second direction 110 so that the vine 118 enters one of the concavities 98, 102 and is guided between the shank 14 and either the third or fourth segment 82, 90 to one of the first or second sharp edges 58, 66, which acts to cut the vine 118. FIG. 8 schematically depicts the vine 118 being cut into two pieces by sharp edge 58 of blade 54.

While the best modes for carrying out the invention have been described in detail, those familiar with the art to which this invention relates will recognize various alternative designs and embodiments for practicing the invention within the scope of the appended claims.

The invention claimed is:

1. A tool comprising:
a shank having a first end and a second end;
a fastening element mounted to the first end of the shank and configured for attachment to a hot stick;
a first prong extending from the second end of the shank;
a second prong extending from the second end of the shank;
said first prong having a first segment that forms a first angle with the shank that is between forty-five degrees and one hundred and thirty-five degrees;
said second prong having a second segment that forms a second angle with the shank that is between forty-five degrees and one hundred and thirty-five degrees;
a first blade having a first sharp edge that is mounted to the first segment;
a second blade having a second sharp edge that is mounted to the second segment.

2. The tool of claim 1, wherein the first blade and the second blade are electrically insulative.

3. The tool of claim 2, wherein the first blade and the second blade are a ceramic material.

4. The tool of claim 3, wherein the shank, first prong, and second prong comprise a polymer.

5. The tool of claim 4, wherein the shank, first prong, and second prong are a composite material having the polymer as a matrix.

6. The tool of claim 2, wherein the shank, first prong, and second prong are electrically insulative.

7. The tool of claim 2, wherein the first segment defines a first slot;
wherein the second segment defines a second slot;
wherein the first blade is partially within the first slot such that the first sharp edge is outside the first slot;
wherein the second blade is partially within the second slot such that the second sharp edge is outside the second slot.

8. The tool of claim 2, wherein the first prong and the second prong form a third angle therebetween;
wherein the third angle is between thirty degrees and one hundred and ten degrees.

9. The tool of claim 8, wherein the third angle is between thirty degrees and seventy-five degrees.

10. The tool of claim 2, wherein the first prong defines a third segment extending from the first segment such that the third segment forms a third angle with the shank;
wherein the second prong defines a fourth segment extending from the second segment such that the fourth segment forms a fourth angle with the shank; and
wherein the third and fourth angles are between ten degrees and seventy degrees.

11. The tool of claim 10, wherein the shank and the first prong define a first concavity; and
wherein the shank and the second prong define a second concavity;
wherein the first sharp edge is within the first concavity; and
wherein the second sharp edge is within the second concavity.

12. The tool of claim 11, wherein a line extends through the shank in the longitudinal dimension;
wherein the line extends in first and second opposite directions;
wherein the first end and the fastening element are in the second direction from the second end and the prongs;
wherein the first and second concavities are open and unobstructed in the second direction; and
wherein the first and second sharp edges are unobstructed in the second direction such that when the tool is moved in the second direction relative to a vine adjacent the shank, the vine will enter at least one of the first and second concavities and contact at least one of the first and second sharp edges.

13. A method of removing a vine that are supported by electrical transmission infrastructure, the method comprising:
attaching the tool of claim 1 to a hot stick;

manipulating the hot stick to cause the vine to contact one of the first and second blades such that the vine is cut into two pieces.

14. A tool comprising:

a shank having a first end and a second end;

a first prong extending from the second end of the shank;

a second prong extending from the second end of the shank;

said first prong having a first segment that forms a first angle with the shank that is between forty-five degrees and one hundred and thirty-five degrees;

said second prong having a second segment that forms a second angle with the shank that is between forty-five degrees and one hundred and thirty-five degrees;

a first blade having a first sharp edge that is mounted to the first segment;

a second blade having a second sharp edge that is mounted to the second segment.

* * * * *